United States Patent Office 3,257,209
Patented June 21, 1966

3,257,209
POULTRY AND LIVESTOCK FEED
Riley W. Lewis, 2615 Park Ave., Minneapolis, Minn.
No Drawing. Filed Apr. 18, 1961, Ser. No. 103,735
3 Claims. (Cl. 99—2)

The present invention relates to a technique for treating soybeans and to such a technique which is particularly adaptable for use as a constituent in poultry and livestock feed, this technique producing a higher fat content meal and changing the molecular structure of the oil, protein and carbohydrates. This results in an improved soybean meal obtainable by this specific toasting and special pressurizing technique.

In the past, in the preparation of poultry and livestock feeds, the soybean meal as an ingredient has been substantially free from soybean oil or fat, essentially all of the oil having been removed.

The essential object of all vegetable oil seed processing plants, including soybean, is to remove all of the oil possible since the oils have been worth about four times (on a weight basis) the value of the meals. This meal is made either by an expeller process wherein the fat content is reduced to below approximately 4%, or in a solvent extraction process wherein the fat or oil content is reduced to approximately 1% or less. It is this substantially oil free or fat free meal which is used as a basis for most of the standard poultry and livestock feeds. It has been proposed in the past and present to utilize whole soybeans with the normal fat content being left in, such as from about 18% to 21%, however this material does not provide a growth rate which is equal to a normally processed meal with the same percentage of extracted soy oil blended back into the meal. In order to obtain the proper amount of oil or fat in the feed, it has been proposed that various vegetable oils or animal fat be supplemented in the feed. This technique has been employed in the past, however, thorough or uniform mixing is difficult to obtain and an uneven distribution of oils or fats in the feeds normally occurs. The final results do not equal those attainable with the feed prepared in accordance with the present invention.

In accordance with the present invention, a poultry and livestock feed is prepared from conventional constituents such as corn meal, vitamins, minerals and the like, the feed including a significant quantity of soybean meal with its oil percentage ranging from about 4% to 20% and preferably from about 10% to about 18%. This meal has been previously toasted and run through a special designed screw press in order to reduce oil in the meal to the desired content within this range. The particular soybean oil meal is included in the feed in a quantity ranging from between about 1 part in 4, up to about 1 part in 2. It will be appreciated that good results may be achieved using different ratios of this soybean oil meal, however, it is felt that the finished product should include the meal in the higher points of this range.

In the toasting process, the cracked or flaked beans are heated in a steam jacketed toaster to a temperature of approximately 185° to 235° F. for a period of about 80 minutes, the lower temperature range being preferred. The meats are removed from the toaster and immediately placed in a specially designed screw press wherein the oil content is reduced. The mechanical pressure alone is generally sufficient to maintain the elevated temperature of the meats without adding additional heat, however, for best results it is felt that a pressing temperature of about 185° to 235° F. is desirable. The maximum pressure in the press should be between about 3500 and 5000 p.s.i. Significant increase in growth rate as well as increase in rate of growth per pound of intake are attainable with poultry and livestock feed, including as a constituent thereof, the improved meal of the present invention.

The toasting time and temperature has been found to destroy the enzyme erease factor without being detrimental to the proteins or lecithins present in the meal. The erease factor in the raw soybean has been found to retard the growth of both poultry and livestock. This finding has been established in a report released by Dr. T. D. Runnels, of the University of Delaware, in "Feedstuffs," of March 1961, page 6; see pages 97–98. Palatability is enhanced through the control of the erease factor, in addition to the growth factors mentioned above. The present invention provides perfect control or elimination of the erease factor of the raw soybean. In this connection it has been found that there must be more heat applied to correct or eliminate the erease factor than has been used in most equipment that has been used so far. The upper temperature attained cannot be too high, but the elevated level must be held for a longer period of time.

It has been found that the soybean meal treated in this fashion retains from about 84% up to about 88% of the other normal nutritional values, including lecithin, proteins and the like, which is normally present in the untreated meal. This nutritional value is considered to be up to 15 times that which is available in solvent extracted type soybean meal.

Lecithin is considered to be an important constituent in foods today, and its preservation in connection with food preparation, is, of course, desirable. Serum cholesterol may be substantially reduced in animals and humans with soybean lecithin. See, Lester M. Morrison, M.D., "Serum Cholesterol Reduction With Lecithin," Geriatrics, vol. 13, pages 12–19, January 1958. It is felt that the advantages of the low serum cholesterol which occurs in the poultry being fed a diet which includes significant quantities of soybean lecithin will be passed on to the ultimate consumer of the meat. Since lecithin is believed to increase the digestibility of oils in food, it is felt that the presence of lecithin contributes to the increased growth rate observed in poultry fed a diet consisting of significant quantities of soybean meal treated in accordance with the present invention.

The available or useful caloric and energy values of soybean oil meal treated in accordance with the present invention have been found to be increased by as much as 25% to 30%. This is manifested in a calorie value increase ranging from about 761 up to about 1,061 calories in the Fraps table over solvent type soybean meal.

The primary object of the present invention is to develop a practical and economical way to make higher energy feeds required to produce the maximum growth of the poultry and livestock to obtain full genetic ability. This can only be done by supplying a more potent and efficient source of energy as furnished by our vegetable oils. Soybean oil has an abundance of essential energy in the natural form of unexcelled quality. The peoples of the Orient have proven that the soybean is the most complete grain known to supply growth, in that they have used the whole soybean as a diet and have grown to achieve normal adulthood with very little other food.

The method of treatment is practical, in that the heat which is applied to the soybean meats and the pressure to which it is subjected are sufficient to make the oils, protein and carbohydrates more digestible. It is believed that the molecular structure of the various protein molecules is significantly changed during the extraction process, and in addition, the process provides a homogenizing action on the oil globule which remains in the meal. It is felt that this homogenizing action aids in providing ease of digestion in the residual oil. Furthermore, it has been observed that the cellular structure of the bean is substantially fractured or ruptured during treatment, thus allowing for faster and more efficient digestive action.

The process is economical, in that mechanical equipment utilized is no more expensive than the now conventional methods of producing soybean meal. In addition, it is less costly to leave a quantity of oil in the meal rather than remove it and then have additional equipment to add the oil back in either the meal or more complete feeds.

The tremendous interest and experimental work that has developed in the past six-year period has proven that the soybean provides a superior source of such protein and oil. Dr. M. H. Scott of the University of Illinois, in his work with the amino acids contained in the protein of the soybean, has concluded that there could be only minor changes in the composition of this source of protein to have a perfect balanced ingredient for growing meats of all kinds. As far back as 1953, Ohio Agricultural Experiment Station reported their findings in "Poultry Science" 32:930 that soybean oil provided substantial advantages over cottonseed oil or lard in improving the growth factor and feed efficiency for a chick diet.

Poultry feed with the meal of the present invention produces tissue characterized by an improved tissue texture and flavor, the fat being distributed through the poultry tissue in a manner which renders the tissue highly tender and more palatable. The growth rate of the poultry feed with the improved feed is significantly faster than can be achieved with conventional meal. It is felt that the soybean oil meal and feed prepared in accordance with the present invention assists the bird in properly assimilating a greater portion of the feed taken. It has been found that this improved growth rate is optimum at 13% of residual oil, is significant at 10% and up to 18% residual oil, and falls off on the underside of these limits.

It is a specific object of the present invention therefore to provide an improved poultry and livestock feed which includes a toasted, partially pressed soybean meal wherein the oil content of the original meal has been reduced to between 10% and 18%.

Other and further objects of the present invention will become apparent to those skilled in the art upon a study of the following example and appended claims.

It is felt that the present invention may be more fully comprehended by referring to a specific example of feed preparation such as is given in Example I hereinbelow.

*Example I*

The premix includes the following composition—

| Ingredient: | Weight, pounds |
|---|---|
| Vitamin and mineral concentrate | 27.0 |
| Fish, 10% fat, 60% protein | 96.8 |
| Meat and bone meal, 10% fat, 60% protein | 87.7 |
| Calcium | 35.0 |
| $CaH(PO_4)$ | 35.0 |
| Salt | 8.7 |
| Dehydrated alfalfa | 114.8 |

The finished product contains—

| Ingredient: | Weight, pounds |
|---|---|
| Pre-mix | 50 |
| Treated soybean oil meal | 600 |
| Corn | 1600 |

The soybean oil meal includes 13% oil and has been initially treated by means of toasting at a temperature of 185° F. for a period of 80 minutes, after which the toasted beans are fed into a screw press and the oil content is reduced in the expelling process to 13%. The above mixture has been found particularly adaptable as a feed for young poultry and livestock, and particularly for turkey poults. In a test wherein the material of Example I is fed to Moorhouse's improved small white turkeys, the birds achieved an average gain in weight of 10 pounds after sixteen weeks as compared to a control group which achieved a 10 pound gain only after twenty weeks. The pounds of feed consumed per bird were substantially identical in the test group as compared to the control group. After a period of twelve weeks, the test group had achieved a weight gain of 6 pounds as compared to only 5 pounds for the control group.

The control group was fed a conventional feed including the ingredients set forth in Example I with the exception that the oil from the soybean meal was essentially entirely removed. In addition to the more rapid growth rate, the meat or tissue of the poults fed with the specially treated soybean oil meal had a substantially greater degree of fat distribution or mottling. This feature contributes to a greater degree of tenderness in the finished meat. In addition, the skin of the bird was colored more deeply, this greater degree of pigmentation being due to the xanthophyll present in the retained oil or fat. This enhanced meat product is believed to be obtained through the particular treatment given the soybean oil meal as set forth hereinabove.

It is generally desirable to change the proportion of oil in the meal with the age of the poults. For example, as the age increases the protein level, energy ratio and calorie content of the feed should likewise increase. Thus, for some purposes, it is desirable that the oil content of the meal be increased along with the age of the poults being fed.

What is claimed is:

1. A method for preparing soybean oil meal which comprises toasting raw, flaked and hulled soybeans at a temperature of between about 185° F. and 235° F. for a period of between about 60 minutes and 100 minutes, thence passing said beans while at said elevated temperature through a pressure chamber wherein the beans are subjected to a compressional force of between 3,500 p.s.i. and 5,000 p.s.i. thus producing a feed component with at least 10% of the soybean oil left therein but which is extremely palatable and from which the Erease factor has been eliminated.

2. The method as set forth in claim 1 being particularly charatcerized in that said temperature is maintained at about 185° F. for a period of about 80 minutes, and said pressure is held between 3,500 and 4,000 p.s.i.

3. An ingredient for poultry and livestock feeds comprising flaked and hulled raw soybeans which have been toasted at a temperature between 180° and 235° for a period of between 60 and 100 minutes and which have been subjected to pressures of between 3,500 and 5,000 p.s.i. to produce an oil content therein ranging between 10% to 18% while maintaining the normal lecithin, protein and carbohydrate levels within said soybeans.

References Cited by the Examiner

UNITED STATES PATENTS

| 2,000,317 | 5/1935 | Bishop | 99—98 |
| 2,065,848 | 12/1936 | Anderson | 99—2 |
| 2,162,729 | 6/1939 | Levinson | 99—2 |
| 2,978,326 | 4/1961 | Kruse | 99—2 |
| 3,033,683 | 5/1962 | Witte et al. | 99—2 |

OTHER REFERENCES

Seiden: Handbook of Feedstuffs, 1957, pp. 473 and 474, Springer Pub. Co., New York.

A. LOUIS MONACELL, *Primary Examiner.*

ABRAHAM H. WINKELSTEIN, *Examiner.*